US012646505B2

(12) United States Patent
Liu et al.

(10) Patent No.: US 12,646,505 B2
(45) Date of Patent: Jun. 2, 2026

(54) CONVERSATIONAL RECOMMENDATION METHOD, METHOD OF TRAINING MODEL, DEVICE AND MEDIUM

(71) Applicant: Beijing Baidu Netcom Science Technology Co., Ltd., Beijing (CN)

(72) Inventors: Zeming Liu, Beijing (CN); Hao Liu, Beijing (CN); Zhengyu Niu, Beijing (CN); Hua Wu, Beijing (CN); Haifeng Wang, Beijing (CN); Hui Xiong, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 407 days.

(21) Appl. No.: 18/059,386

(22) Filed: Nov. 28, 2022

(65) Prior Publication Data

US 2023/0088445 A1    Mar. 23, 2023

(30) Foreign Application Priority Data

Feb. 18, 2022    (CN) .......................... 202210154576.8

(51) Int. Cl.
*G10L 15/16*        (2006.01)
*G10L 15/06*        (2013.01)
        (Continued)

(52) U.S. Cl.
CPC ............ *G10L 15/16* (2013.01); *G10L 15/063* (2013.01); *G10L 15/1815* (2013.01);
        (Continued)

(58) Field of Classification Search
CPC ....... G10L 15/00; G10L 15/16; G10L 15/063; G10L 15/1815; G10L 15/22;
        (Continued)

(56) References Cited

U.S. PATENT DOCUMENTS 10,965,812 B1*    3/2021  Das ........................ G06F 40/216
2017/0091635 A1*  3/2017  Anderson .......... G06Q 10/0637
        (Continued)

FOREIGN PATENT DOCUMENTS

CN        110704703        1/2020
CN        111368046        7/2020
        (Continued)

OTHER PUBLICATIONS

Chinese Office Action, issued in the corresponding Chinese patent application No. 202210154576.8, dated Aug. 16, 2023, 11 pages.

*Primary Examiner* — Sean E Serraguard
(74) *Attorney, Agent, or Firm* — HSML P. C.

(57)        ABSTRACT

A conversational recommendation method, a method of training a conversational recommendation model, an electronic device, and a storage medium are provided, which are related to a technical field of data processing, in particular to technical fields of voice interaction, deep learning, artificial intelligence and the like. The conversational recommendation method includes: acquiring a historical conversation information; determining a target conversation object to be generated, from a conversation target graph based on the historical conversation information, the conversation target graph includes an object node, the object node is configured to represent a conversation object, and the target conversation object is determined based on the object node; and generating a target conversation information for recommendation based on the target conversation object.

11 Claims, 6 Drawing Sheets

100

103

102

User

101

(51) Int. Cl.
   *G10L 15/18* (2013.01)
   *G10L 15/22* (2006.01)
(52) U.S. Cl.
   CPC ...... *G10L 15/22* (2013.01); *G10L 2015/0631*
   (2013.01); *G10L 2015/228* (2013.01)
(58) Field of Classification Search
   CPC ......... G10L 2015/00; G10L 2015/0631; G10L
   2015/228
   See application file for complete search history.

(56) References Cited

U.S. PATENT DOCUMENTS

| | | | |
|---|---|---|---|
| 2018/0189267 A1* | 7/2018 | Takiel | G10L 15/19 |
| 2020/0105255 A1* | 4/2020 | Huang | G06F 16/3334 |
| 2020/0143265 A1* | 5/2020 | Jonnalagadda | G06N 3/045 |
| 2021/0209312 A1 | 7/2021 | He | |

FOREIGN PATENT DOCUMENTS

| | | |
|---|---|---|
| CN | 113268609 | 8/2021 |
| CN | 113569032 | 10/2021 |
| CN | 113641807 | 11/2021 |

* cited by examiner

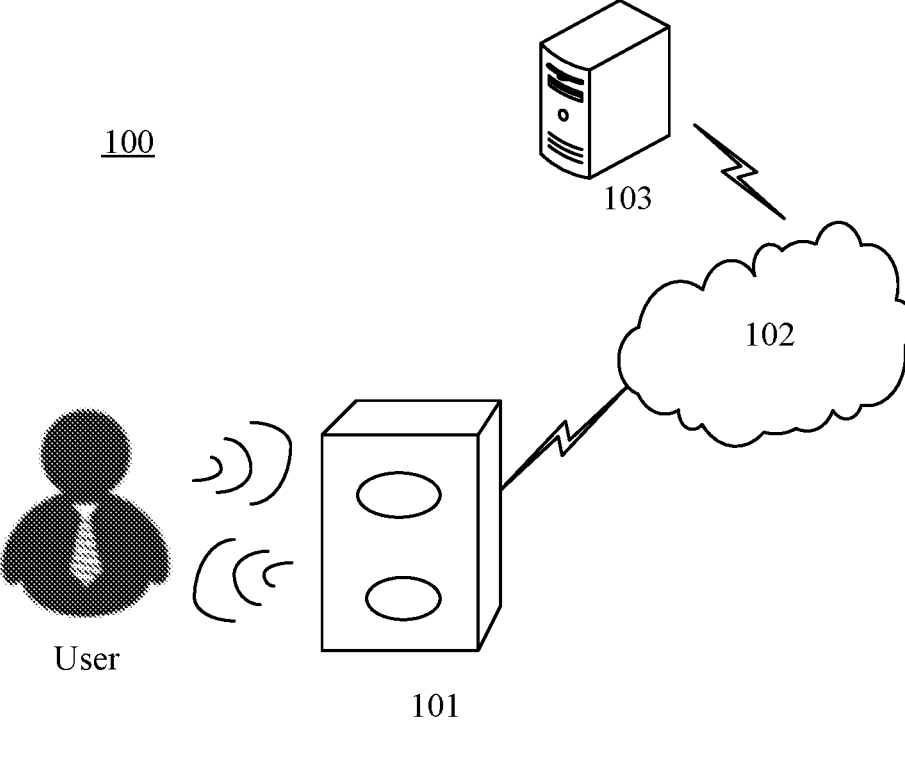

100

103

102

User

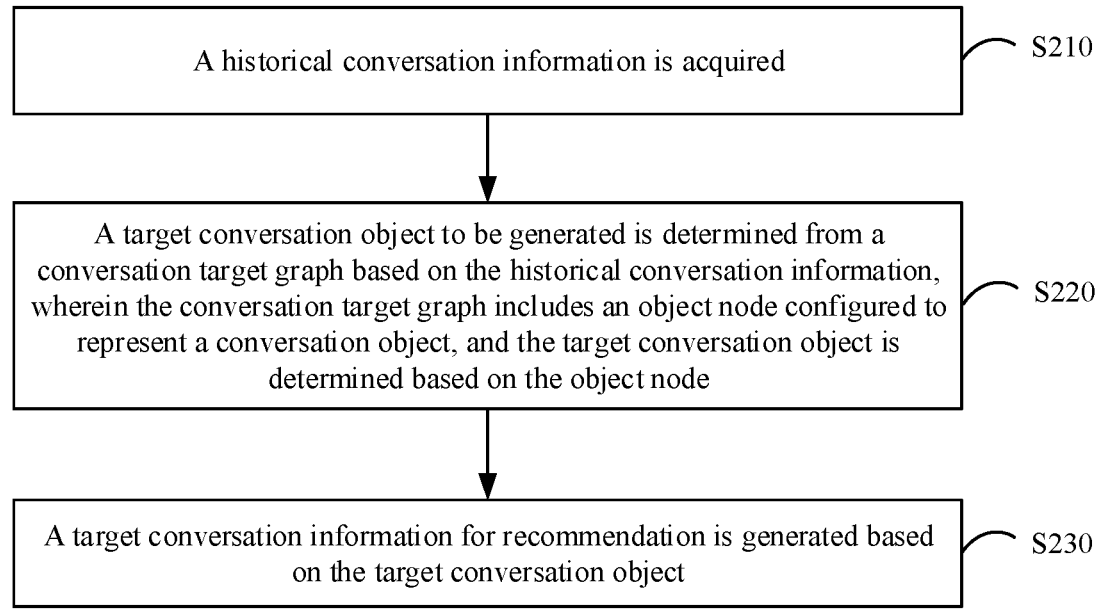

A historical conversation information is acquired ⌐ S210

A target conversation object to be generated is determined from a conversation target graph based on the historical conversation information, wherein the conversation target graph includes an object node configured to represent a conversation object, and the target conversation object is determined based on the object node ⌐ S220

A target conversation information for recommendation is generated based on the target conversation object ⌐ S230

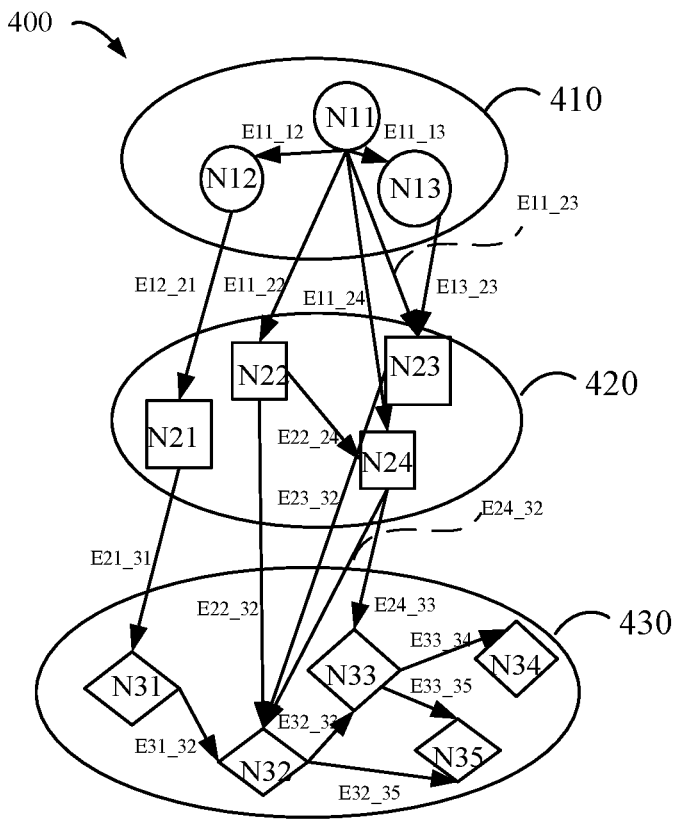

A training sample is acquired

A conversational recommendation model is trained by using the training sample, to obtain a trained conversational recommendation model, wherein the trained conversational recommendation model is configured to: acquire the historical conversation information; determine the target conversation object to be generated, from the conversation target graph based on the historical conversation information, wherein the conversation target graph includes the object node, the object node is configured to represent the conversation object, and the target conversation object is determined based on the object node; and generate the target conversation information for recommendation based on the target conversation object

CONVERSATIONAL RECOMMENDATION METHOD, METHOD OF TRAINING MODEL, DEVICE AND MEDIUM

CROSS-REFERENCE TO RELATED APPLICATIONS

This application is claims priority to Chinese Application No. 202210154576.8 filed on Feb. 18, 2022, which is incorporated herein by reference in its entirety.

TECHNICAL FIELD

The present disclosure relates to a technical field of data processing, in particular to technical fields of voice interaction, deep learning, artificial intelligence and the like, and especially related to a conversational recommendation method and apparatus, a method and an apparatus of training a conversational recommendation model, an electronic device, a storage medium and a program product.

BACKGROUND

Voice interaction is a natural way of human interaction. With the continuous development of artificial intelligence technology, it has been achieved that a machine may understand human voice, understand an inner meaning of the voice, and give corresponding feedback. In these operations, the accurate understanding of semantics, the rapidity of feedback, and the giving of corresponding opinions or suggestions have all become factors that affect the smoothness of the voice interaction.

SUMMARY

The present disclosure provides a conversational recommendation method, a method of training a conversational recommendation model, an electronic device, and a storage medium.

According to an aspect of the present disclosure, a conversational recommendation method is provided, including: acquiring a historical conversation information; determining a target conversation object to be generated, from a conversation target graph based on the historical conversation information, wherein the conversation target graph includes an object node, the object node is configured to represent a conversation object, and the target conversation object is determined based on the object node; and generating a target conversation information for recommendation based on the target conversation object.

According to another aspect of the present disclosure, a method of training a conversational recommendation model is provided, including: training the conversational recommendation model by using a training sample, to obtain a trained conversational recommendation model; wherein the trained conversational recommendation model is configured to: acquire a historical conversation information; determine a target conversation object to be generated, from a conversation target graph based on the historical conversation information, wherein the conversation target graph includes an object node, the object node is configured to represent a conversation object, and the target conversation object is determined based on the object node; and generate a target conversation information for recommendation based on the target conversation object.

According to another aspect of the present disclosure, an electronic device is provided, including: at least one processor; and a memory communicatively connected to the at least one processor; wherein the memory stores instructions executable by the at least one processor, and the instructions, when executed by the at least one processor, cause the at least one processor to implement the method according to the present disclosure.

According to another aspect of the present disclosure, a non-transitory computer-readable storage medium having computer instructions stored thereon is provided, wherein the computer instructions are configured to cause a computer to implement the method according to the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, in which:

FIG. 1 schematically shows an exemplary system architecture to which a conversational recommendation method and apparatus may be applied according to an embodiment of the present disclosure;

FIG. 2 schematically shows a flowchart of a conversational recommendation method according to an embodiment of the present disclosure;

FIG. 4 schematically shows a schematic diagram of a conversation target graph according to an embodiment of the present disclosure;

FIG. 5 schematically shows a flowchart of a method of training a conversational recommendation model according to an embodiment of the present disclosure;

DETAILED DESCRIPTION OF EMBODIMENTS

Figure 3A:
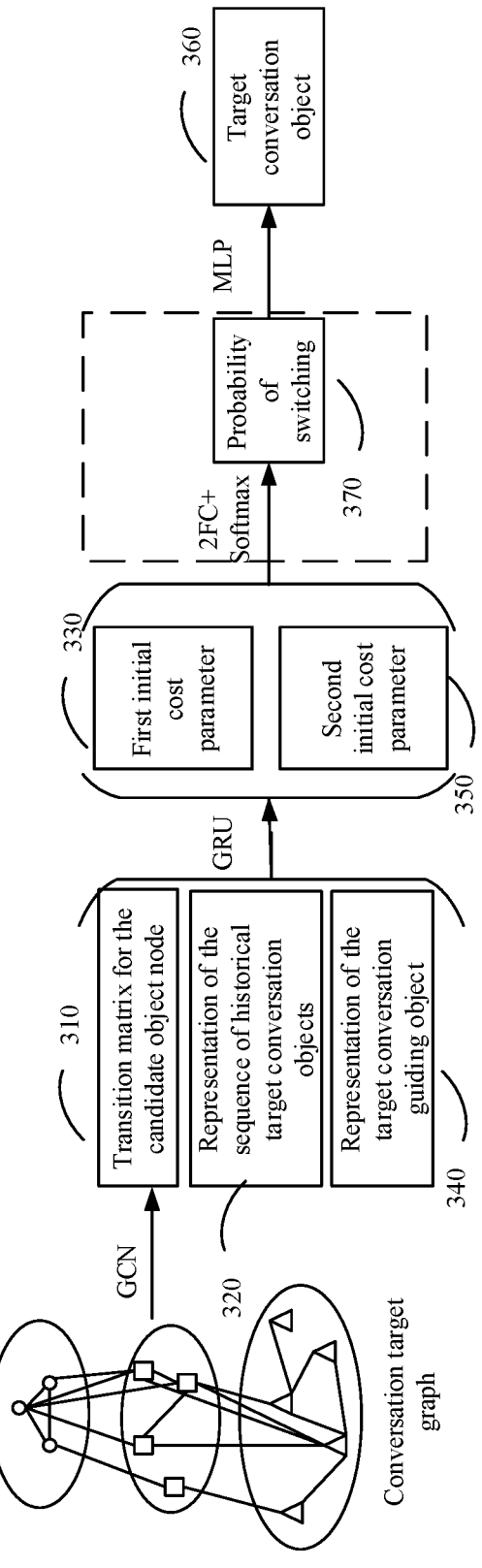
FIG. 3A schematically shows a flowchart of determining a target conversation object according to an embodiment of the present disclosure.

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and concise-ness, descriptions of well-known functions and structures are omitted in the following description.

The present disclosure provides a conversational recom-mendation method, a method of training a conversational recommendation model, an apparatus, an electronic device, a storage medium and a program product.

According to an aspect of the present disclosure, a con-versational recommendation method is provided, including: acquiring a historical conversation information; determining a target conversation object to be generated, from a conver-sation target graph based on the historical conversation information, wherein the conversation target graph includes an object node, the object node is configured to represent a conversation object, and the target conversation object is determined based on the object node; and generating a target conversation information for recommendation based on the target conversation object.

In the technical solution of the present disclosure, the collection, storage, use, processing, transmission, provision, disclosure and application of the user's personal information involved are all in compliance with the relevant laws and regulations, and necessary confidentiality measures have been taken, and do not violate the public order and good customs.

In the technical solution of the present disclosure, the authorization or consent of the user is acquired before the user's personal information is acquired or collected.

FIG. 1 schematically shows an exemplary system archi-tecture to which a conversational recommendation method and apparatus may be applied according to an embodiment of the present disclosure.

It should be noted that FIG. 1 is only an example of a system architecture to which the embodiments of the present disclosure may be applied, so as to help those skilled in the art to understand the technical content of the present dis-closure, but it does not mean that the embodiments of the present disclosure cannot be used for other device, system, environment or scene. For example, in another embodiment, the exemplary system architecture to which the conversa-tional recommendation method and apparatus may be applied may include a voice interaction device, but the voice interaction device may implement the conversational rec-ommendation method and apparatus provided by the embodiments of the present disclosure without interacting with a server.

As shown in FIG. 1, a system architecture 100 according to this embodiment may include a voice interaction device 101, a network 102 and a server 103. The network 102 is a medium used to provide a communication link between the voice interaction device 101 and the server 103. The net-work 102 may include various connection types, such as wired and/or wireless communication links, and the like.

A user may output conversation information such as interactive voice to the voice interaction device 101. After the voice interaction device 101 receives the interactive voice from the user, the voice interaction device 101 may interact with the server 103 through the network 102, and send the interactive voice to the server 103, so that the server 103 generates target conversation information such as rec-ommendation information based on the interactive voice. The server 103 may send the target conversation information to the voice interaction device 101 through the network 102, so that the voice interaction device 101 replies the target conversation information to the user in an interactive man-ner.

Various communication client applications, such as a knowledge reading application, a web browser application, a search application, an instant communication tool, an email client and/or a social platform software, etc. (only examples), may be installed on the voice interaction device 101.

The voice interaction device 101 may have a sound collector, such as a microphone, to collect the user's wake-up voice and interactive voice. At the same time, the voice interaction device 101 may also have a sound player, such as a speaker, to play the target conversation information from the voice interaction device.

The voice interaction device 101 may be any electronic device capable of interacting through a voice signal. The voice interaction device 101 may include, but is not limited to, a smart phone, a tablet computer, a laptop computer, a smart speaker, a car speaker, a smart tutor, a smart robot, and the like.

The server 103 may be a server that provides various services, such as a background management server (just an example) that performs voice recognition on the interactive voice transmitted by the voice interaction device 101 and performs subsequent generation of the target conversation information based on the interactive voice.

It should be understood that the numbers of terminal devices, networks and servers in FIG. 1 are merely illustra-tive. There may be any number of terminal devices, net-works and servers as desired in practice.

It should be noted that a sequence number of each operation in the following method is only used as a repre-sentation of the operation for the convenience of description, and should not be regarded as representing an execution order of the respective operation. The method need not be performed in the exact order shown unless explicitly stated.

FIG. 2 schematically shows a flowchart of a conversa-tional recommendation method according to an embodiment of the present disclosure.

As shown in FIG. 2, the method includes operations S210 to S230.

In operation S210, a historical conversation information is acquired.

In operation S220, a target conversation object to be generated is determined from a conversation target graph based on the historical conversation information, wherein the conversation target graph includes an object node con-figured to represent a conversation object, and the target conversation object is determined based on the object node.

In operation S230, a target conversation information for recommendation is generated based on the target conversa-tion object.

According to an embodiment of the present disclosure, an expression form of the historical conversation information is not limited. For example, the historical conversation infor-mation may be text information or voice information. An expression type of the historical conversation information is also not limited. For example, the expression type of the historical conversation information may be an inquiry type or a chat type, as long as it is historical conversation information generated during the conversation in a process of human-computer interaction.

According to an embodiment of the present disclosure, the historical conversation information may be historical conversation information generated in a predetermined his-torical time period during the conversation, or historical conversation information generated during an entire conver-sation period. The historical conversation information may include historical conversation information output by the user, or may include both the historical conversation information output by the user and historical conversation information output by the voice interaction device.

According to an embodiment of the present disclosure, the conversation target graph may include a plurality of object nodes. The plurality of object nodes may have a connection edge with each other. The object node may be configured to represent a conversation object. The connection edge may be configured to represent an association relationship between two connected object nodes.

According to an embodiment of the present disclosure, the object node in the conversation target graph may be used as a candidate object node. The candidate object node is configured to represent a candidate conversation object to be generated. A target conversation object to be generated may be determined from the conversation target graph.

According to an embodiment of the present disclosure, determining the target conversation object to be generated, from the conversation target graph based on the historical conversation information may include: identifying semantic information of the historical conversation information generated during the conversation, determining a target object node, from the candidate object node in the conversation target graph based on the semantic information, and determining a target conversation object corresponding to the target object node based on the target object node. However, it is not limited to this. Determining the target conversation object to be generated, from the conversation target graph based on the historical conversation information may further include: determining a historical target conversation object of the historical conversation information generated during the conversation, determining the target object node, from the candidate object node in the conversation target graph based on the historical target conversation object, and determining the target conversation object corresponding to the target object node based on the target object node.

According to an embodiment of the present disclosure, a type of the target conversation object may include, but is not limited to, a conversation type used for recommendation. The type of the target conversation object may further include, for example, a conversation type used for chat, a conversation type used for command, or a conversation type used for question and answer. The type of the target conversation object may further include a conversation topic, for example, an actor, a singer, an athlete, a concert, an opera, or other entities in the conversation. The type of the conversation object may further include a topic attribute, for example, an attribute information for the conversation topic such as an evaluation of a conversation topic, a discussion of a conversation topic, or the like. However, it is not limited to this. The conversation object may further include any other entity type related to conversation, as long as it is a type of the target conversation object involved in the process of human-computer interaction.

According to an embodiment of the present disclosure, generating the target conversation information for recommendation based on the target conversation object may include: generating target conversation information for replying by taking the target conversation object as a part of the target conversation information. However, it is not limited to this. It is also possible to identify a semantic information of the target conversation information to be generated based on the target conversation object, and generate the target conversation information based on the semantic information of the target conversation information to be generated. Therefore, the generated target conversation information may be more natural and close to a conversation term of normal people.

With the conversational recommendation method provided by the embodiment of the present disclosure, the target conversation object to be generated for recommendation during the conversation is planned by using the historical conversation information in combination with the conversation target graph, so that the target conversation information generated based on the target conversation object may be coherent with the historical conversation information, and the conversation contexts in the conversation process may be linked up naturally. In addition, the target conversation object is determined based on the object node(s) in the conversation target graph, so that the conversation content in the target conversation information is initiative, well-planned and leading, thereby improving the functionality and intelligence of the recommended conversation.

According to an embodiment of the present disclosure, for operation S220, determining the target conversation object to be generated, from the conversation target graph based on the historical conversation information includes: determining, based on the historical conversation information and a target conversation guiding information, the target conversation object from the conversation target graph.

According to an embodiment of the present disclosure, the target conversation guiding information may be used to guide the generation of the target conversation object to be generated during the conversation. The target conversation guiding information may include a target conversation guiding object of the same type as the target conversation object. The target conversation guiding information may be used as target conversation object to be generated at a target time instant during the conversation.

For example, the historical conversation information may be a conversation information in a duration from a time instant 0 to a time instant t in the human-computer interaction. The target conversation guiding information may be a target conversation object expected to be generated at a time instant t+m in the future. A target conversation object at a time instant t+1 may be determined from the conversation target graph based on the historical conversation information in the duration from the time instant 0 to the time instant t and the target conversation object at the time instant t+m. m is a number greater than 0.

According to an embodiment of the present disclosure, it is also possible to use the target conversation guiding information only as an information for guiding the generation of the target conversation object, and the target conversation guiding information does not appear in the target conversation object and the target conversation information. The target conversation guiding information just plays a guiding role.

According to an embodiment of the present disclosure, a trajectory of the generated conversation in a conversation interaction process may be obtained based on the historical conversation information. The target conversation guiding information may be used as a guidance of the conversation to be generated in the conversation interaction process. By the definition in terms of both the historical conversation information and the target conversation guiding information, a well-planned target conversation object may be generated.

According to an embodiment of the present disclosure, a type of the target conversation object includes at least one of a conversation type used for recommendation, a conversation topic and a topic attribute. However, the type of the target conversation object is not limited to this. The type of the target conversation object may further include a conversation type used for chat, a conversation type used for command, or a conversation type used for question and answer. The conversation types used for chat, command, question and answer or the like and the conversation type used for recommendation may be taken as the conversation type.

According to an embodiment of the present disclosure, the type of the target conversation object includes a triad. For example, for a triad of the conversation type, the conversation topic, and the topic attribute, a plurality of types of target conversation objects may be determined in an asynchronous manner. For each type of the target conversation object, following determination operations may be performed.

For example, a sequence of historical target conversation objects in the historical conversation information is determined based on the historical conversation information. A cost parameter of a candidate object node for the conversation target graph is determined based on the sequence of historical target conversation objects, the target conversation guiding information and the conversation target graph. The target conversation object is determined from the candidate object node(s) based on the cost parameter(s) of the candidate object node(s).

According to an embodiment of the present disclosure, the cost parameter may be referred as a transition cost representation or a transition cost matrix. An element in the cost parameter is used to represent a transition probability between two adjacent candidate object nodes.

According to an embodiment of the present disclosure, the sequence of historical target conversation objects may be a sequence of historical target conversation objects which are generated at different time instants during the conversation and ordered time in the historical conversation information. However, it is not limited to this. The sequence of historical target conversation objects may be a historical target conversation object generated during the conversation in the historical conversation information. The number of elements in the sequence may be determined according to the number of historical target conversation objects in the historical conversation information.

According to an embodiment of the present disclosure, a type of the candidate object node matches a type of the sequence of historical target conversation objects. Before determining the cost parameter of the candidate object node based on the sequence of historical target conversation objects, the target conversation guiding information and the conversation target graph, the conversational recommendation method may further include an operation of determining the candidate object node(s). For example, a candidate object node of a type identical to the type of the sequence of historical target conversation objects may be determined from the target graph based on the sequence of historical target conversation objects.

FIG. 3A schematically shows a flowchart of determining a target conversation object according to an embodiment of the present disclosure.

As shown in FIG. 3A, a graph convolutional network (GCN) may be used to process the candidate object node(s) in the conversation target graph to obtain a transition matrix 310 for the candidate object node(s).

As shown in FIG. 3A, a gated recurrent unit (GRU) of a recurrent neural network (RNN) may be used to process a representation 320 of the sequence of historical target conversation objects and the transition matrix 310 for the candidate object node(s), to determine a first initial cost parameter 330 of the candidate object node(s).

According to an embodiment of the present disclosure, the representation of the sequence of historical target conversation objects may be obtained by processing the sequence of historical target conversation objects by using an input layer (e.g., an embedding layer).

As shown in FIG. 3A, a representation formed by combining the representation of the sequence of historical target conversation objects with the transition matrix for the candidate object node and a representation 340 of the target conversation guiding object may be processed using GRU, to obtain a second initial cost parameter 350 of the candidate object node.

According to an embodiment of the present disclosure, the input layer is used to process information of the same type as the sequence of historical target conversation objects in the target conversation guiding information. For example, the input layer is used to process a target conversation guiding object of the same type as the sequence of historical target conversation objects, to obtain the target conversation guiding object representation.

According to an embodiment of the present disclosure, combining the representation of the sequence of historical target conversation objects with the transition matrix for the candidate object node may include: concatenating the representation of the sequence of historical target conversation objects and the transition matrix for the candidate object node into a matrix.

According to an embodiment of the present disclosure, the cost parameter of the candidate object node may be determined based on the first initial cost parameter and the second initial cost parameter. For example, the first initial cost parameter and the second initial cost parameter may be determined as the cost parameter of the candidate object node.

As shown in FIG. 3A, a multi-layer perceptron (MLP) may be used to process the first initial cost parameter 330 and the second initial cost parameter 350 to obtain a multi-classification result. A target conversation object node is determined from the candidate object node based on the multi-classification result. The target conversation object node is used to represent the target conversation object, thereby obtaining a target conversation object 360, e.g. a target conversation object related to the conversation type, a target conversation object related to the conversation topic, and a target conversation object related to the topic attribute.

According to an embodiment of the present disclosure, the above-mentioned method of determining the target conversation object is suitable for determining the target conversation object related to the conversation type. However, it is not limited to this. The above-mentioned method of determining the target conversation object is also suitable for determining the target conversation object related to the conversation topic and the target conversation object related to the topic attribute. The above-mentioned method of determining the target conversation object may be used to asynchronously determine the target conversation object related to the conversation type, the target conversation object related to the conversation topic, and the target conversation object related to the topic attribute.

As shown in FIG. 3A, in a case that the type of the target conversation object is the conversation type or the conversation topic, determining the target conversation object from the candidate object node based on the cost parameter of the candidate object node may further include the following operations.

For example, a probability 370 of switching the target conversation object node is determined based on the cost parameter of the candidate object node, e.g., the first cost parameter 330 and the second cost parameter 350. In a case that the probability of switching is determined to be greater than or equal to a predetermined switching threshold, the target conversation object is determined from the candidate object node(s) based on the cost parameter(s) of the candidate object node(s). In a case that the probability of switching is determined to be smaller than the predetermined switching threshold, the target conversation object is determined from the sequence of historical target conversation objects.

For example, the cost parameter of the candidate object node may be processed by using a cascaded first fully connected layer, a second fully connected layer and a first activation function (e.g., a 2FC+softmax activation function), to determine the probability of switching the target conversation object node.

According to an embodiment of the present disclosure, the predetermined switching threshold may not be limited. For example, the predetermined switching threshold may be 0.5.

According to an embodiment of the present disclosure, in the case that the probability of switching is determined to be smaller than the predetermined switching threshold, a historical target conversation object at a time instant t in the sequence of historical target conversation objects may be used as a target conversation object at a time instant t+1.

For example, according to the probability of switching, it is determined that the switching of the target conversation object related to the conversation type needs to be performed. The historical conversation information including "I don't want to talk about movies right now" may be switched to the target conversation information including "Then let's talk about star XX, he is the best actor". The historical target conversation object "movie recommendation" related to the conversation type is switched to the target conversation object "chat".

For example, according to the probability of switching, it is determined that the switching of the target conversation object about the conversation type is not required. The historical conversation information including "let's chat" may be extended to the target conversation information including "OK, I am free". Both the historical target conversation object related to the conversation type and the target conversation object are "greetings".

According to an embodiment of the present disclosure, the probability of switching may be used to determine whether to perform a classification prediction for the switching of the target conversation object, so as to achieve an interpretable and controllable determination of the target conversation object. In addition, by generating the target conversation information based on the target conversation object generated in this way, a smooth and natural conversation may be achieved.

Figure 3B:
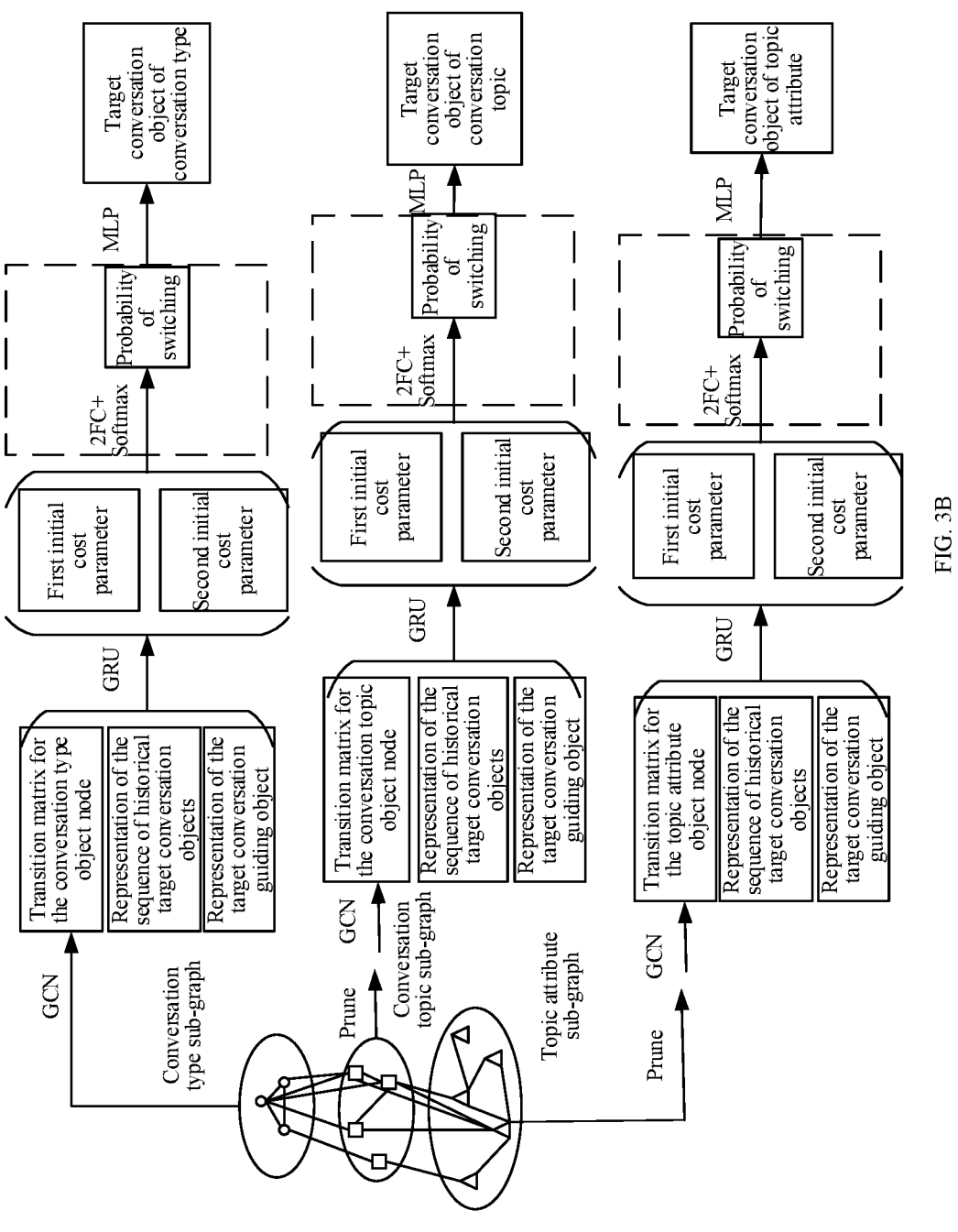
FIG. 3B schematically shows a flowchart of determining a target conversation object according to another embodiment of the present disclosure.

FIG. 3B schematically shows a flowchart of determining a target conversation object according to another embodiment of the present disclosure.

As shown in FIG. 3B, in a case that the type of the target conversation object is the topic attribute, determining the target conversation object from the candidate object node based on the cost parameter of the candidate object node may include the following operations.

For example, a probability of generating the target conversation object node is determined based on the cost parameter of the candidate object node, such as the first cost parameter and the second cost parameter. In a case that the probability of generating is determined to be greater than or equal to a predetermined generation threshold, the target conversation object is determined from the candidate object node(s) based on the cost parameter(s) of the candidate object node(s).

For example, the cost parameter of the candidate object node may be processed by using a third fully connected layer, a fourth fully connected layer and a second activation function (e.g., the 2FC+softmax activation function) which are cascaded, in order to determine the probability of generating the target conversation object node.

According to an embodiment of the present disclosure, the predetermined generation threshold may not be limited. For example, the predetermined generation threshold may be 0.5.

According to an embodiment of the present disclosure, in a case that the probability of generating is determined to be smaller than the predetermined generation threshold, the operation of determining the target conversation object of this type may be not performed.

For example, the target conversation object that needs to be generated about the topic attribute is determined according to the probability of generating. The historical conversation information including "The song name is very meaningful" may be extended to the target conversation information including "Yes, never get tired of listening to it".

For example, according to the probability of generating, it is determined that generating a target conversation object related to the topic attribute is not required. The historical conversation information including "I think he is sincere" may be switched to the target conversation information including "let's recommend a song he sang, which is called "YY".

According to an embodiment of the present disclosure, the probability of generating may be used to determine whether a classification prediction process for the switching of the target conversation object is required for the target conversation object related to the topic attribute, so as to achieve an interpretable and controllable determination of the target conversation object. In addition, by generating the target conversation information based on the target conversation object generated in this way, a smooth and natural conversation may be achieved.

According to an embodiment of the present disclosure, the conversation target graph may include a heterogeneous hierarchical conversation target graph. The heterogeneous hierarchical conversation target graph may include a plurality of conversation target sub-graphs. The plurality of conversation target sub-graphs may include three, for example, a conversation type conversation target sub-graph, a conversation topic conversation target sub-graph, and a topic attribute conversation target sub-graph. However, it is not limited to this. The plurality of conversation target sub-graphs may include two conversation target sub-graphs, for example, the conversation type conversation target sub-graph and the conversation topic conversation target sub-graph. The plurality of conversation target sub-graphs may include four or more conversation target sub-graphs, as long as there is a hierarchical relationship among the plurality of conversation target sub-graphs and types of respective object nodes of the plurality of conversation target sub-graphs are different from each other.

FIG. 4 schematically shows a schematic diagram of a conversation target graph according to an embodiment of the present disclosure.

As shown in FIG. 4, a heterogeneous hierarchical conversation target graph 400 includes three conversation target sub-graphs, such as a conversation type conversation target sub-graph 410, a conversation topic conversation target sub-graph 420, and a topic attribute conversation target sub-graph 430. The three conversation target sub-graphs have the hierarchical relationship. For example, the conversation type conversation target sub-graph 410 is the conversation target sub-graph at a first level. An object node in the conversation type conversation target sub-graph 410 is represented by a circular node. The conversation topic conversation target sub-graph 420 is the conversation target sub-graph at a second level. An object node in the conversation topic conversation target sub-graph 420 is represented by a square node. The topic attribute conversation target sub-graph 430 is the conversation target sub-graph at a third level. An object node in the topic attribute conversation target sub-graph 420 is represented by a diamond node.

As shown in FIG. 4, taking the conversation type conversation target sub-graph 410 as an example, the conversation type conversation target sub-graph 410 may include a plurality of object nodes of the same type. For example, the conversation type conversation target sub-graph 410 may include a plurality of object nodes N11, N12, and N13 that belong to the same conversation type. N11 may be used to represent an object node whose conversation type is question and answer. N12 may be used to represent an object node of a conversation type being recommendation. N13 may be used to represent an object node of a conversation type being movie recommendation. The plurality of object nodes N11, N12, and N13 have connection edges with each other for representing an isomorphic association relationship, for example, a connection edge E11_12 between N11 and N12, and a connection edge E11_13 between N11 and N13. The connection edge has an arrow for representing a switching direction of the object node. For example, the arrow of the connection edge E11_13 is directed from the object node N11 to the object node N13, representing a switching from the object node N11 to the object node N13 which is of the same type as the object node N11.

According to an embodiment of the present disclosure, the conversation type of the conversation may be guided to recommend multiple times or support user decision-making, based on a conversation type conversation target sub-graph in a pre-trained heterogeneous hierarchical conversation target graph. In addition, by using the conversation topic conversation target sub-graph and the topic attribute conversation target sub-graph, it is possible to further improve the closeness of the conversation to user's expected communication content and to improve the user experience and the user's chat duration.

According to an embodiment of the present disclosure, the type of object nodes of one of two adjacent conversation target sub-graphs is different from the type of object nodes of the other of the two adjacent conversation target sub-graphs. A connection edge between the plurality of object nodes in the conversation target sub-graph at a higher level and the plurality of object nodes in the conversation target sub-graph at a current level is used to represent a heterogeneous association relationship.

As shown in FIG. 4, the conversation target sub-graph at the second level is the conversation topic conversation target sub-graph 420. The second level is taken as the current level. Object nodes at the current level may include a plurality of object nodes N21, N22, N23, and N24 that belong to the same conversation topic type. A type of any object node at the current level (e.g., an object node related to the conversation topic) is different from a type of any object node at the higher level (e.g., an object node about the conversation type). The connection edge between object nodes of two adjacent levels is used to represent the heterogeneous association relationship. For example, a connection edge E12_21 is disposed between the node N12 and the node N21. An arrow of the connection edge E12_21 is directed from the object node N12 to the object node N21, representing a switching from the object node N12 to the object node N21 of a heterogeneous type.

According to an embodiment of the present disclosure, in the case of determining the transition matrix for the candidate object node based on the conversation target graph, taking the conversation type as an example, the conversation type conversation target sub-graph is used as the conversation target sub-graph at the first level, and all object nodes in the conversation type conversation target sub-graph may be used as candidate object nodes in the conversation target sub-graph at the current level, so as to use GCN to determine the transition matrix for the candidate object node in the conversation target sub-graph at the current level.

According to another embodiment of the present disclosure, taking the conversation type as an example, but not limited to this, the following method of determining the transition matrix for the candidate object node in the conversation target sub-graph at the current level is also applicable to the conversation topic target sub-graph. Taking the conversation type conversation target sub-graph as the conversation target sub-graph at the first level, all object nodes in the conversation type conversation target sub-graph may be used as candidate object nodes in the conversation target sub-graph at the first level, so as to use a network combined with GCN and an attention mechanism to determine the transition matrix for the candidate object node in the conversation target sub-graph at the first level. For example, the object node of the conversation target sub-graph at the current level are GCN is represented by using GCN, and the object node representation of the conversation target sub-graph at a next level are aggregated by using attention mechanism, so as to obtain the transition matrix for the candidate object node in the conversation target sub-graph at the current level.

According to an embodiment of the present disclosure, as compared with using GCN to determine the transition matrix for the candidate object node, using the network combined with GCN and attention mechanism to determine the transition matrix for the candidate object node may combine more information in the heterogeneous hierarchical conversation target graph, so that transition matrix information of the determined candidate object node is more abundant, thereby make the determined target conversation object more precise.

According to an embodiment of the present disclosure, in the case of determining the transition matrix for the candidate object node based on the heterogeneous hierarchical conversation target graph, taking the conversation topic as an example, but not limited to this, the following method of determining the transition matrix for the candidate object node in the conversation target sub-graph at the current level is also applicable to the topic attribute target sub-graph. A conversation target sub-graph of the conversation topic of the conversation target sub-graph at the second level may be used as the conversation target sub-graph at the current level. The conversation type conversation target sub-graph of the conversation target sub-graph at the first level may be used as the conversation target sub-graph at the higher level. The candidate object node in the conversation target sub-graph at the current level may be determined based on the heterogeneous association relationship in the heterogeneous hierarchical conversation target graph and the determined target object node in the conversation target sub-graph at the higher level.

As shown in FIG. 4, the conversation topic conversation target sub-graph is used as the conversation target sub-graph at the current level, so that the determined target object node in the conversation target sub-graph at the higher level may be, for example, the target object node N11 at the higher level. By using the heterogeneous hierarchical conversation target graph, it may be determined that the target object node N11 at the higher level is respectively connected to the object nodes N22, N23 and N24 in the conversation target sub-graph at the current level by the connection edges E11_22, E11_23 and E11_24. In view of this, the target object node N11 has the heterogeneous association relationship with the object nodes N22, N23, and N24, respectively. Based on the heterogeneous association relationship, it may be determined that the candidate object nodes in the hierarchical conversation target sub-graph at the current level include the object nodes N22, N23, and N24. On this basis, the operation of determining the transition matrix for the candidate object node based on the conversation target graph may be performed.

With the method of determining the candidate object node provided by the embodiments of the present disclosure, the heterogeneous association relationship in the heterogeneous hierarchical conversation target graph may be used to determine an object node in the conversation target sub-graph at the current level associated with the target conversation object at the higher level, as a candidate object node in the conversation target sub-graph at the current level. The plurality of object nodes may be screened roughly so as to achieve a pruning operation. As compared with taking all the object nodes in the conversation target sub-graph as the candidate object nodes, the pruning operation reduces the number of candidate object nodes, thereby reducing the amount of data processing, improving a processing efficiency and improving conversation quality at the same time.

According to an embodiment of the present disclosure, for operation S230, generating the target conversation information based on the target conversation object may include the following operations.

For example, the target conversation information is generated based on the target conversation object, the historical conversation information and the sequence of historical target conversation objects. The target conversation object may be target conversation object at a current moment, e.g. a time instant t. The sequence of historical target conversation objects may include a sequence of historical target conversation objects generated during a historical time period, e.g., a time period from a time instant 0 to the time instant t, in the conversation.

According to another embodiment of the present disclosure, the target conversation information may be generated based on the target conversation object, the historical conversation information and historical target conversation object at a predetermined historical time instant during the conversation. The predetermined historical time instant during the conversation may be a previous time instant of the current time instant. For example, the previous time instant t−1 of the current time instant t is used as the predetermined historical time instant during the conversation.

According to an embodiment of the present disclosure, the target conversation object may include a conversation type target conversation object, a conversation topic target conversation object, and a topic attribute target conversation object. Three types of target conversation objects, three types of historical conversation information, and three types of sequences of historical target conversation objects corresponding to the three types of target conversation objects in one-to-one correspondence may be input into a codec to obtain the target conversation information.

According to an embodiment of the present disclosure, a bidirectional GRU and a hierarchical gated fusion unit (HGFU) may be respectively used as an encoder and a decoder, to process the target conversation object, the historical conversation information and the sequence of historical target conversation objects, thereby generating the target conversation information for reply.

According to an embodiment of the present disclosure, by generating the target conversation information based on the target conversation object, the historical conversation information and the sequence of historical target conversation objects, a natural and informative target conversation information may be generated while an accurate recommendation may be achieved.

FIG. 5 schematically shows a flowchart of a method of training a conversational recommendation model according to an embodiment of the present disclosure.

As shown in FIG. 5, the method includes operations S510 to S520.

In operation S510, a training sample is acquired.

In operation S520, a conversational recommendation model is trained by using the training sample, to obtain a trained conversational recommendation model.

According to an embodiment of the present disclosure, the trained conversational recommendation model is configured to: acquire the historical conversation information; determine the target conversation object to be generated, from the conversation target graph based on the historical conversation information, wherein the conversation target graph includes the object node, the object node is configured to represent the conversation object, and the target conversation object is determined based on the object node; and generate the target conversation information for recommendation based on the target conversation object.

According to an embodiment of the present disclosure, the method of training a conversational recommendation model may include operations S510 and S520. However, it is not limited to this. The method of training a conversational recommendation model may further include operation S510.

Figure 6:
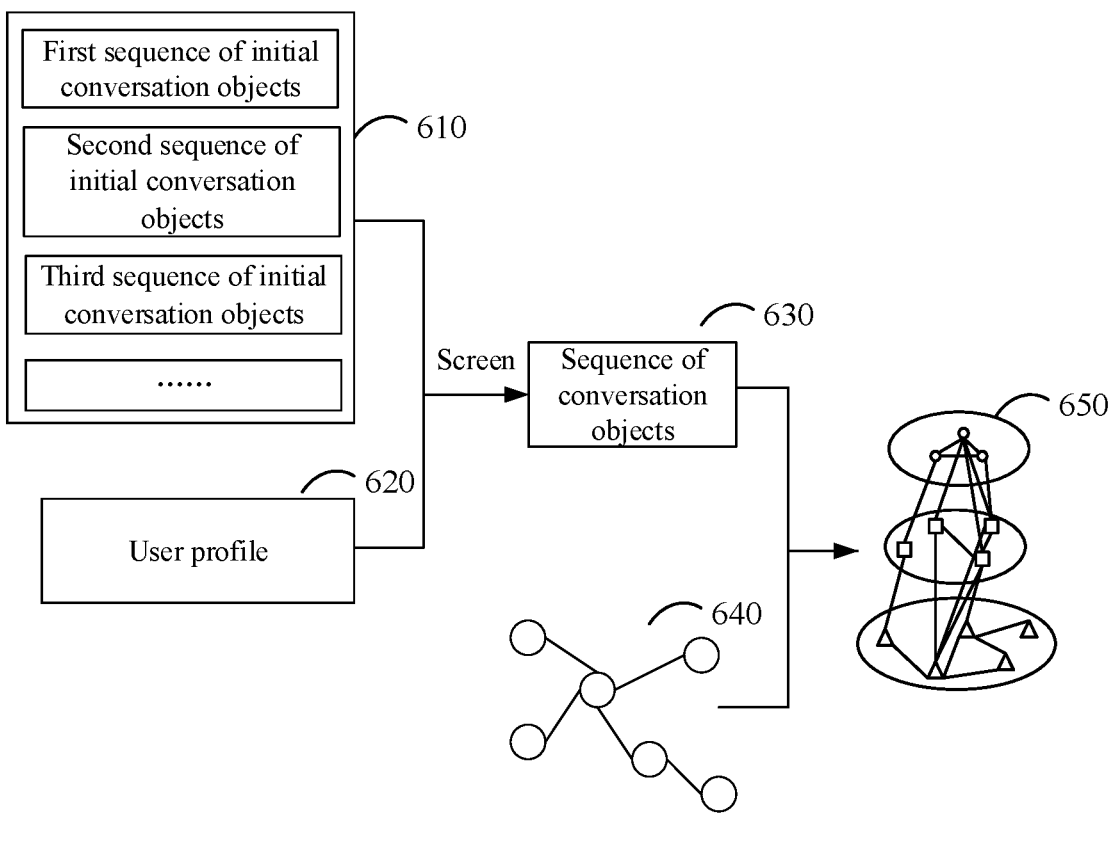
FIG. 6 schematically shows a flowchart of generating an initial conversation target graph according to another embodiment of the present disclosure.

FIG. 6 schematically shows a flowchart of generating an initial conversation target graph according to another embodiment of the present disclosure.

As shown in FIG. 6, a plurality of initial conversation object sequences 610 may be acquired. The plurality of initial conversation object sequences 610 are screened using a user profile 620 to obtain a sequence 630 of conversation objects. An initial conversation target graph 650 is generated based on the sequence 630 of conversation objects and a knowledge graph 640.

According to an embodiment of the present disclosure, a type of the plurality of initial conversation object sequences may include at least one of a conversation type used for recommendation, a conversation topic and a topic attribute. However, it is not limited to this. The type of the plurality of initial conversation object sequences may further include a conversation type used for chat, a conversation type used for command, or a conversation type used for question and answer.

According to an embodiment of the present disclosure, taking the initial conversation object sequence of the conversation type used for recommendation as an example, the initial conversation object sequence may include {greetings, movie recommendation, chat, music recommendation, music recommendations, play music}.

According to an embodiment of the present disclosure, the user profile may be tag data that is abstracted based on information such as user's attribute information, user preference, living habit and user behavior to identify users. The user profile may be used to learn about movies, food, sports, songs, or the like that the user is interested in. Accordingly, a conversation object sequence that conforms to the user's preference or matches the user's interest may be determined from the plurality of initial conversation object sequences.

According to an embodiment of the present disclosure, the knowledge graph may refer to a semantic network that reveals a relationship between entities. The knowledge graph may be constructed using triple data such as (entity 1, relationship, entity 2) or (entity, attribute, attribute value).

According to an embodiment of the present disclosure, an initial conversation target graph for planning a conversation direction may be formed by using the conversation object sequence and the corresponding knowledge graph data, etc.

According to an embodiment of the present disclosure, a conversational recommendation model including the initial conversation target graph is trained by using the training sample, to obtain the conversation target graph in the trained conversational recommendation model. The conversation target graph may include a heterogeneous hierarchical conversation target graph. The heterogeneous hierarchical conversation target graph includes a plurality of conversation target sub-graphs having the hierarchical relationship with each other. Each conversation target sub-graph among the plurality of conversation target sub-graphs includes a plurality of object nodes of the same type. A connection edge between the plurality of object nodes of the same type is configured to represent the homogeneous association relationship. The type of object nodes of one of two adjacent conversation target sub-graphs is different from the type of object nodes of the other of the two adjacent conversation target sub-graphs. A connection edge between a plurality of objects nodes in the conversation target sub-graph at the current level and a plurality of objects nodes in the conversation target sub-graph at the higher level is configured to represent the heterogeneous association relationship.

According to an embodiment of the present disclosure, the heterogeneous hierarchical conversation target graph may be set to include a conversation type conversation target sub-graph, a conversation topic conversation target sub-graph, and a topic attribute conversation target sub-graph. Object nodes in the conversation type conversation target sub-graph are set to different conversation types for recommendation, such as restaurant recommendation, food recommendation, music recommendation, singer recommendation, movie recommendation, etc., so as to achieve a conversation with multiple active recommendation or a recommended conversation that support user decision-making. In addition, by setting the heterogeneous hierarchical conversation target graph to include a conversation topic conversation target sub-graph and a topic attribute conversation target sub-graph, the conversation content is expanded and layers of the conversation are enriched, thereby providing a smooth and natural conversation.

According to an embodiment of the present disclosure, the training sample may include a sample conversation information and a label corresponding to the sample conversation information, and the label includes a sample conversation object. A type of the label includes at least one of the conversation type of recommendation, the conversation topic and the topic attribute.

According to an embodiment of the present disclosure, the sample conversation information may include: recommend a movie "MM" for you, a wonderful martial arts movie! The label corresponding to the sample conversation information may include [movie recommendation, "MM", a wonderful martial arts movie]. "Movie recommendation" is a label of the conversation type used for recommendation. "MM" is a label of the conversation topic. "A wonderful martial arts movie" is a label of the topic attribute.

According to an embodiment of the present disclosure, a plurality of sample conversation information may be input into an initial conversation recommendation model as a sequence of the sample conversation information, to obtain a prediction result. A loss function is used to process the prediction result and the label to obtain a loss value. A parameter in the initial conversation recommendation model is adjusted based on the loss value until the loss value converges. When the loss value of the model converges, the model is used as a trained conversational recommendation model.

According to an embodiment of the present disclosure, a type of the loss function is not limited, as long as the loss function and the training sample may be used to train the initial conversational recommendation model including the initial conversation target graph.

Figure 7:
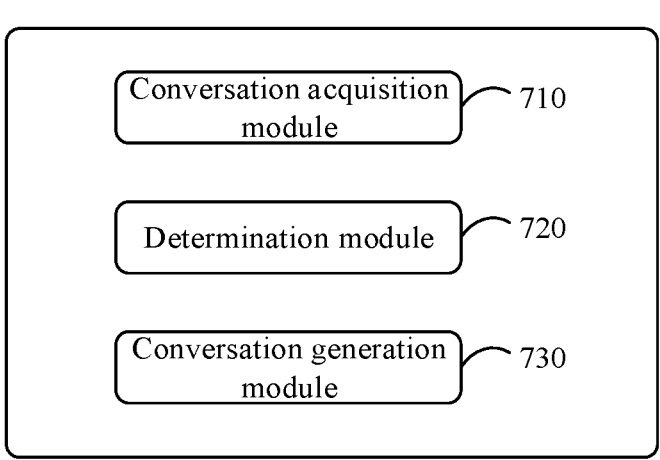
FIG. 7 schematically shows a block diagram of a conversational recommendation apparatus according to an embodiment of the present disclosure.

FIG. 7 schematically shows a block diagram of a conversational recommendation apparatus according to an embodiment of the present disclosure.

As shown in FIG. 7, a conversational recommendation apparatus 700 includes a conversation acquisition module 710, a determination module 720 and a conversation generation module 730.

The conversation acquisition module 710 is configured to acquire the historical conversation information.

The determination module 720 is configured to determine the target conversation object to be generated, from the conversation target graph based on the historical conversation information, wherein the conversation target graph includes an object node, the object node is configured to represent the conversation object, and the target conversation object is determined based on the object node.

The conversation generation module 730 is configured to generate the target conversation information for recommendation based on the target conversation object.

According to an embodiment of the present disclosure, the determination module may include a determination sub-module.

The determination sub-module is configured to determine, based on the historical conversation information and the target conversation guiding information, the target conversation object from the conversation target graph, wherein the historical conversation information is the information generated during the conversation, and the target conversation guiding information is configured to guide the generation of the target conversation object to be generated during the conversation.

According to an embodiment of the present disclosure, the determination sub-module may include a first determination unit, a second determination unit and a third determination unit.

The first determination unit is configured to determine the sequence of historical target conversation objects in the historical conversation information based on the historical conversation information.

The second determination unit is configured to determine the cost parameter of a candidate object node for the conversation target graph based on the sequence of historical target conversation objects, the target conversation guiding information and the conversation target graph, wherein the type of the candidate object node matches the type of the sequence of historical target conversation objects.

The third determination unit is configured to determine the target conversation object from the candidate object node based on the cost parameter of the candidate object node.

According to an embodiment of the present disclosure, the second determination unit may include a first determination sub-unit, a second determination sub-unit, a third determination sub-unit and a fourth determination sub-unit.

The first determination sub-unit is configured to determine the transition matrix for the candidate object node based on the conversation target graph.

The second determination sub-unit is configured to determine the first initial cost parameter of the candidate object node based on the sequence of historical target conversation objects and the transition matrix for the candidate object node.

The third determination sub-unit is configured to determine the second initial cost parameter of the candidate object node based on the sequence of historical target conversation objects, the target conversation guiding information and the transition matrix for the candidate object node.

The fourth determination sub-unit is configured to determine the cost parameter of the candidate object node based on the first initial cost parameter and the second initial cost parameter.

According to an embodiment of the present disclosure, the third determination unit may include a fifth determination sub-unit, a sixth determination sub-unit and a seventh determination sub-unit.

The fifth determination sub-unit is configured to determine the probability of switching the target conversation object node based on the cost parameter of the candidate object node.

The sixth determination sub-unit is configured to determine the target conversation object from the candidate object node based on the cost parameter of the candidate object node, in response to determining that the probability of switching is greater than or equal to the predetermined switching threshold.

The seventh determination sub-unit is configured to determine the target conversation object from the sequence of historical target conversation objects, in response to determining that the probability of switching is smaller than the predetermined switching threshold.

According to an embodiment of the present disclosure, the third determination unit may include an eighth determination sub-unit and a ninth determination sub-unit.

The eighth determination sub-unit is configured to determine the probability of generating the target conversation object node based on the cost parameter of the candidate object node.

The ninth determination sub-unit is configured to determine the target conversation object from the candidate object node based on the cost parameter of the candidate object node, in response to determining that the probability of generating is greater than or equal to the predetermined generation threshold.

According to an embodiment of the present disclosure, the conversation target graph includes the heterogeneous hierarchical conversation target graph, the heterogeneous hierarchical conversation target graph includes a plurality of conversation target sub-graphs having the hierarchical relationship with each other, each conversation target sub-graph among the plurality of conversation target sub-graphs includes a plurality of object nodes of the same type, the connection edge between the plurality of object nodes of the same type is configured to represent the homogeneous association relationship, the type of object nodes of one of two adjacent conversation target sub-graphs is different from the type of object nodes of the other of the two adjacent conversation target sub-graphs, and a connection edge between a plurality of objects nodes in the conversation target sub-graph at a current level and a plurality of objects nodes in the conversation target sub-graph at a higher level is configured to represent the heterogeneous association relationship.

According to an embodiment of the present disclosure, the target conversation object includes a plurality of target conversation objects having levels.

According to an embodiment of the present disclosure, the first determination sub-unit is configured to: determine a candidate object node in the conversation target sub-graph at the current level based on the heterogeneous association relationship in the heterogeneous hierarchical conversation target graph and a determined target object node in the conversation target sub-graph at the higher level, wherein the target object node in the conversation target sub-graph at the higher level corresponds to a target conversation object at the higher level, and the candidate object node in the conversation target sub-graph at the current level corresponds to a candidate conversation object at the current level; and determine a transition matrix for the candidate object node at the current level based on the candidate object node for the conversation target sub-graph at the current level, and taking the transition matrix for the candidate object node at the current level as the transition matrix for the candidate object node.

According to an embodiment of the present disclosure, the conversation generation module may include a conversation generation unit.

The conversation generation unit is configured to generate the target conversation information based on the target conversation object, the historical conversation information and the sequence of historical target conversation objects.

According to an embodiment of the present disclosure, the type of the target conversation object includes at least one of a conversation type used for recommendation, a conversation topic and a topic attribute.

Figure 8:
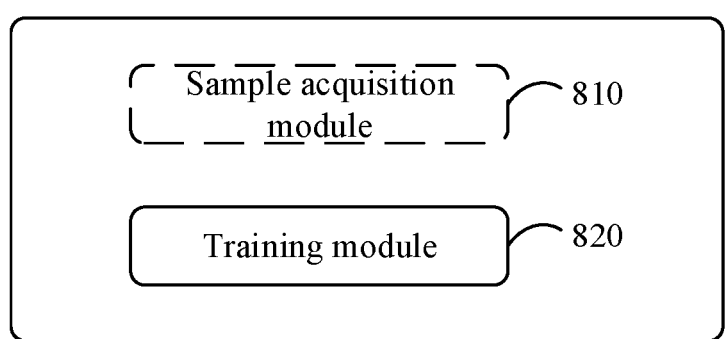
FIG. 8 schematically shows a block diagram of an apparatus of training a conversational recommendation model according to an embodiment of the present disclosure.

FIG. 8 schematically shows a block diagram of an apparatus of training a conversational recommendation model according to an embodiment of the present disclosure.

As shown in FIG. 8, an apparatus 800 of training a conversational recommendation model may include a sample acquisition module 810 and a training module 820.

The sample acquisition module 810 is configured to acquire the training sample.

The training module 820 is configured to train the conversational recommendation model by using a training sample, to obtain the trained conversational recommendation model.

According to an embodiment of the present disclosure, the trained conversational recommendation model is configured to: acquire the historical conversation information; determine the target conversation object to be generated, from a conversation target graph based on the historical conversation information, wherein the conversation target graph includes the object node, the object node is configured to represent the conversation object, and the target conversation object is determined based on the object node; and generate the target conversation information for recommendation based on the target conversation object.

According to an embodiment of the present disclosure, the apparatus 800 of training a conversational recommendation model may include the sample acquisition module 810 and the training module 820. However, it is not limited to this. The apparatus 800 of training a conversational recommendation model may include the training module 820.

According to an embodiment of the present disclosure, the training sample includes the sample conversation information and the label corresponding to the sample conversation information, and the label includes the sample conversation object.

According to an embodiment of the present disclosure, the type of the label includes at least one of a conversation type used for recommendation, a conversation topic and a topic attribute.

According to an embodiment of the present disclosure, the apparatus of training a conversational recommendation model may further include a sequence determination module and a graph generation module.

The sequence determination module is configured to determine the sequence of conversation objects.

The graph generation module is configured to generate the initial conversation target graph based on the sequence of conversation objects and the knowledge graph, so as to train the conversational recommendation model including the initial conversation target graph by using the training sample, to obtain the conversation target graph in the trained conversational recommendation model.

According to an embodiment of the present disclosure, the present disclosure further provides an electronic device, a readable storage medium, and a computer program product.

According to an embodiment of the present disclosure, the electronic device includes at least one processor; and a memory communicatively connected to the at least one processor, wherein the memory stores instructions executable by the at least one processor, and the instructions, when executed by the at least one processor, cause the at least one processor to implement the method according to an embodiment of the present disclosure.

According to an embodiment of the present disclosure, a non-transitory computer-readable storage medium having computer instructions stored thereon is provided, wherein the computer instructions are configured to cause a computer to implement the method according to an embodiment of the present disclosure.

According to an embodiment of the present disclosure, a computer program product containing a computer program is provided, wherein the computer program, when executed by a processor, causes the processor to implement the method according to an embodiment of the present disclosure.

Figure 9:
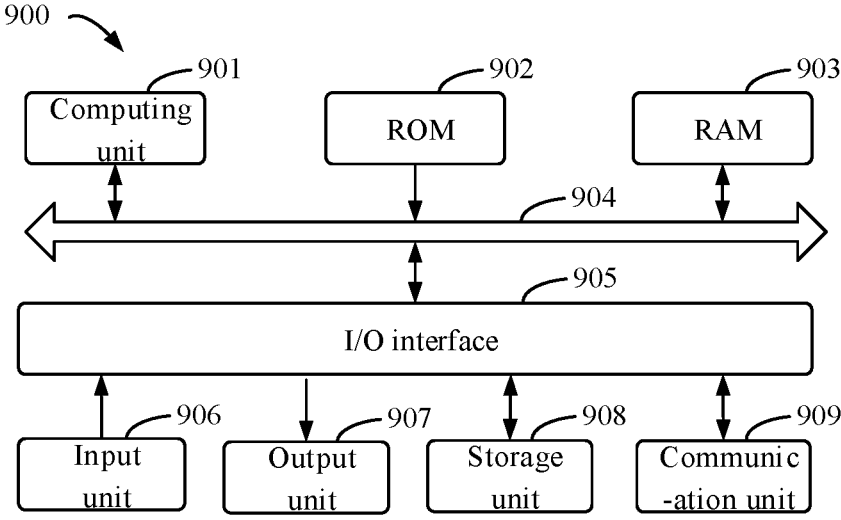
FIG. 9 schematically shows a block diagram of an electronic device suitable for implementing a conversational recommendation method according to an embodiment of the present disclosure.

FIG. 9 shows a schematic block diagram of an exemplary electronic device 900 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the device 900 may include a computing unit 901, which may perform various appropriate actions and processing based on a computer program stored in a read-only memory (ROM) 902 or a computer program loaded from a storage unit 908 into a random access memory (RAM) 903. Various programs and data required for the operation of the device 900 may be stored in the RAM 903. The computing unit 901, the ROM 902 and the RAM 903 are connected to each other through a bus 904. An input/output (I/O) interface 905 is further connected to the bus 904.

Various components in the device 900, including an input unit 906 such as a keyboard, a mouse, etc., an output unit 907 such as various types of displays, speakers, etc., a storage unit 908 such as a magnetic disk, an optical disk, etc., and a communication unit 909 such as a network card, a modem, a wireless communication transceiver, etc., are connected to the I/O interface 905. The communication unit 909 allows the device 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 901 may perform the various methods and processes described above, such as the conversational recommendation method or the method of training a conversational recommendation model. For example, in some embodiments, the conversational recommendation method or the method of training a conversational recommendation model may be implemented as a computer software program that is tangibly contained on a machine-readable medium, such as a storage unit 908. In some embodiments, part or all of a computer program may be loaded and/or installed on the device 900 via the ROM 902 and/or the communication unit 909. When the computer program is loaded into the RAM 903 and executed by the computing unit 901, one or more steps of the conversational recommendation method or the method of training a conversational recommendation model described above may be performed. Alternatively, in other embodiments, the computing unit 901 may be configured to perform the conversational recommendation method or the method of training a conversational recommendation model in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A conversational recommendation method, comprising:
acquiring historical conversation information;
determining a target conversation object to be generated from a conversation target graph based on the historical conversation information, wherein
the conversation target graph comprises an object node,
the object node is configured to represent a conversation object, and
the target conversation object is determined based on the object node; and
generating a target conversation information for recommendation based on the target conversation object,
wherein the determining of the target conversation object to be generated from a conversation target graph based on the historical conversation information comprises:
determining, based on the historical conversation information and a target conversation guiding information, the target conversation object from the conversation target graph, wherein
the historical conversation information is information generated during a conversation, and
the target conversation guiding information is configured to guide the generation of the target conversation object to be generated during the conversation, and the target conversation guiding information comprises:
a target conversation guiding object being of a same type as the target conversation object, and
the target conversation guiding object is used as a target conversation object to be generated at a target time instant during the conversation,
wherein the determining, based on the historical conversation information and the target conversation guiding information, the target conversation object from the conversation target graph comprises:
determining a sequence of historical target conversation objects in the historical conversation information based on the historical conversation information,

wherein the sequence of historical target conversation objects is a sequence of historical target conversation objects in chronological order which are generated at different time instants during the conversation in the historical conversation information;

determining a cost parameter of a candidate object node for the conversation target graph based on the sequence of historical target conversation objects, the target conversation guiding information and the conversation target graph, wherein a type of the candidate object node matches a type of the sequence of historical target conversation objects; and determining the target conversation object from the candidate object node based on the cost parameter of the candidate object node.

2. The method according to claim 1, wherein the determining of the cost parameter of the candidate object node for the conversation target graph based on the sequence of historical target conversation objects, the target conversation guiding information and the conversation target graph comprises:

determining a transition matrix for the candidate object node based on the conversation target graph;

determining a first initial cost parameter of the candidate object node based on the sequence of historical target conversation objects and the transition matrix for the candidate object node;

determining a second initial cost parameter of the candidate object node based on the sequence of historical target conversation objects, the target conversation guiding information and the transition matrix for the candidate object node; and determining the cost parameter of the candidate object node based on the first initial cost parameter and the second initial cost parameter.

3. The method according to claim 2, wherein the determining of the target conversation object from the candidate object node based on the cost parameter of the candidate object node comprises:

determining a probability of switching the target conversation object node based on the cost parameter of the candidate object node;

determining the target conversation object from the candidate object node based on the cost parameter of the candidate object node, in response to determining that the probability of switching is greater than or equal to a predetermined switching threshold; and determining the target conversation object from the sequence of historical target conversation objects, in response to determining that the probability of switching is smaller than the predetermined switching threshold.

4. The method according to claim 2, wherein the determining of the target conversation object from the candidate object node based on the cost parameter of the candidate object node comprises:

determining a probability of generating the target conversation object node based on the cost parameter of the candidate object node; and determining the target conversation object from the candidate object node based on the cost parameter of the candidate object node, in response to determining that the probability of generating is greater than or equal to a predetermined generation threshold.

5. The method according to claim 2, wherein the conversation target graph comprises:

a heterogeneous hierarchical conversation target graph, the heterogeneous hierarchical conversation target graph comprising:

a plurality of conversation target sub-graphs having a hierarchical relationship with each other, each conversation target sub-graph among the plurality of conversation target sub-graphs comprising:

a plurality of object nodes of a same type, wherein a connection edge between the plurality of object nodes of the same type is configured to represent a homogeneous association relationship, the type of object nodes of one of two adjacent conversation target sub-graphs is different from the type of object nodes of the other of the two adjacent conversation target sub-graphs, and a connection edge between a plurality of objects nodes in the conversation target sub-graph at a current level and a plurality of objects nodes in the conversation target sub-graph at a higher level is configured to represent a heterogeneous association relationship.

6. The method according to claim 5, wherein the target conversation object comprises a plurality of target conversation objects having levels; and wherein the determining of the transition matrix for the candidate object node based on the conversation target graph comprises:

determining a candidate object node in the conversation target sub-graph at the current level based on the heterogeneous association relationship in the heterogeneous hierarchical conversation target graph and a determined target object node in the conversation target sub-graph at the higher level, wherein the target object node in the conversation target sub-graph at the higher level corresponds to a target conversation object at the higher level, and the candidate object node in the conversation target sub-graph at the current level corresponds to a candidate conversation object at the current level; and determining a transition matrix for the candidate object node at the current level based on the candidate object node for the conversation target sub-graph at the current level, and taking the transition matrix for the candidate object node at the current level as the transition matrix for the candidate object node.

7. The method according to claim 1, wherein the generating of the target conversation information based on the target conversation object comprises:

generating the target conversation information based on the target conversation object, the historical conversation information and the sequence of historical target conversation objects.

8. The method according to claim 1, wherein a type of the target conversation object node comprises at least one of a conversation type of recommendation, a conversation topic, or a topic attribute.

9. An electronic device, comprising:

at least one processor; and a memory communicatively connected to the at least one processor, wherein the memory stores instructions executable by the at least one processor, and the instructions, when executed by the at least one processor, cause the at least one processor to implement the conversational recommendation method of claim 1.

10. The electronic device according to claim 9, wherein the at least one processor is further configured to:

determine a transition matrix for the candidate object node based on the conversation target graph;

determine a first initial cost parameter of the candidate object node based on the sequence of historical target conversation objects and the transition matrix for the candidate object node;

determine a second initial cost parameter of the candidate object node based on the sequence of historical target conversation objects, the target conversation guiding information and the transition matrix for the candidate object node; and determine the cost parameter of the candidate object node based on the first initial cost parameter and the second initial cost parameter.

11. A non-transitory computer-readable storage medium having computer instructions stored thereon, wherein the computer instructions are configured to cause a computer to implement the conversational recommendation method of claim 1.

\* \* \* \* \*